(12) United States Patent
Li et al.

(10) Patent No.: US 11,223,275 B2
(45) Date of Patent: *Jan. 11, 2022

(54) SWITCHING MODE POWER SUPPLY CIRCUIT

(71) Applicant: SHANGHAI TUITUO TECHNOLOGY CO., LTD, Shanghai (CN)

(72) Inventors: Renhong Li, Shanghai (CN); Zhuo Shen, Shanghai (CN)

(73) Assignee: SHANGHAI TUITUO TECHNOLOGY CO., LTD, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/915,635

(22) Filed: Jun. 29, 2020

(65) Prior Publication Data

US 2020/0328672 A1    Oct. 15, 2020

Related U.S. Application Data

(63) Continuation of application No. PCT/CN2019/081715, filed on Apr. 8, 2019.

(30) Foreign Application Priority Data

Apr. 10, 2018 (CN) .......................... 201810316858.7

(51) Int. Cl.
*H02M 1/42* (2007.01)
*H02M 1/08* (2006.01)
(Continued)

(52) U.S. Cl.
CPC ........... *H02M 1/4225* (2013.01); *H02M 1/08* (2013.01); *H02M 1/36* (2013.01); *H02M 1/4241* (2013.01);
(Continued)

(58) Field of Classification Search
CPC ........ H02M 1/0067; H02M 1/08; H02M 1/36; H02M 1/4225; H02M 1/4233;
(Continued)

(56) References Cited

U.S. PATENT DOCUMENTS 6,194,880 B1    2/2001  Fraidlin et al.
10,498,224 B2 * 12/2019  Li ..................... H02M 1/4225
(Continued)

FOREIGN PATENT DOCUMENTS

CN    1388633 A    1/2003
CN    1551472 A    12/2004
(Continued)

*Primary Examiner* — Yemane Mehari
(74) *Attorney, Agent, or Firm* — Muncy, Geissler, Olds & Lowe, P.C.

(57) ABSTRACT

A switching mode power supply (SMPS) circuit is disclosed herein which includes: a first input rectification circuit, a first capacitor, a feedback control and driving circuit, and at least one boost circuit. The first input rectification circuit rectifies an input voltage and charges the first capacitor, forming a first loop. The second input rectification circuit rectifies the input voltage and charges the second capacitor, forming a second loop. The first inductor, second capacitor and first switching component form a third loop in which rectified voltage on the second capacitor charges the first inductor. The first inductor, second capacitor, first capacitor and first output rectification circuit form a fourth loop in which induced voltage on the first inductor and voltage on the second capacitor are superimposed to charge the first capacitor through the first output rectification circuit. The SMPS circuit provides low noise, high efficiency, and no inrush current in the first output rectification circuit.

10 Claims, 12 Drawing Sheets

(51) Int. Cl.
  *H02M 1/36* (2007.01)
  *H02M 1/44* (2007.01)
  *H02M 3/156* (2006.01)
  *H02M 7/06* (2006.01)
  *H02M 1/00* (2006.01)

(52) U.S. Cl.
  CPC ............ *H02M 1/44* (2013.01); *H02M 3/156* (2013.01); *H02M 7/06* (2013.01); *H02M 1/0067* (2021.05)

(58) Field of Classification Search
  CPC .. H02M 1/4241; H02M 1/425; H02M 1/4258; H02M 1/44; H02M 3/156–3/158; H02M 2001/0058
  USPC ................................. 363/125, 126, 131, 132
  See application file for complete search history.

(56) References Cited

U.S. PATENT DOCUMENTS

| | | | | |
|---|---|---|---|---|
| 10,498,225 | B2* | 12/2019 | Li | H02M 1/4258 |
| 10,498,226 | B2* | 12/2019 | Li | H02M 3/33569 |
| 10,700,612 | B2* | 6/2020 | Li | H02M 1/083 |
| 2002/0145891 | A1* | 10/2002 | Ling | H02M 3/1588 363/59 |
| 2014/0169051 | A1* | 6/2014 | Nakao | H02M 1/4225 363/126 |
| 2016/0276924 | A1* | 9/2016 | Castelli | H02M 1/4225 |
| 2017/0302160 | A1 | 10/2017 | Marcinkiewicz et al. | |

FOREIGN PATENT DOCUMENTS

| | | |
|---|---|---|
| CN | 2894060 Y | 4/2007 |
| CN | 101136584 A | 3/2008 |
| CN | 201091060 Y | 7/2008 |
| CN | 101394091 A | 3/2009 |
| CN | 107887898 A | 4/2018 |
| CN | 108448888 A | 8/2018 |
| CN | 108494274 A | 9/2018 |
| DE | 102015221414 B4 | 3/2017 |
| DE | 102016108942 A1 | 11/2017 |
| EP | 3051650 A1 | 8/2016 |
| JP | H08-126322 A | 5/1996 |
| TW | M346217 U | 12/2008 |

* cited by examiner

SWITCHING MODE POWER SUPPLY CIRCUIT

CROSS-REFERENCE TO RELATED APPLICATION

This application is Continuation of International Patent Application No. PCT/CN2019/081715, filed on Apr. 8, 2019, entitled "SWITCHING POWER SUPPLY CIRCUIT" which claims priority of Chinese Patent Application No. 201810316858.7, filed on Apr. 10, 2018, and the entire disclosures of which are incorporated herein.

TECHNICAL FIELD

The invention relates to a switching mode power supply (SMPS) circuit having a boost converter featured with high immunity to surge, high efficiency and low cost. The circuit boosts input AC voltage and outputs regulated output voltage, achieving power factor function.

BACKGROUND

Electrical equipment or appliance with AC-DC supply connected to AC power grid line has to satisfy current harmonic standard IEC61000-3-2. To different equipment or application, IEC61000-3-2 sets their corresponding current harmonic limits, for example: Class A, Class B, Class C and Class D.

Figure 1:
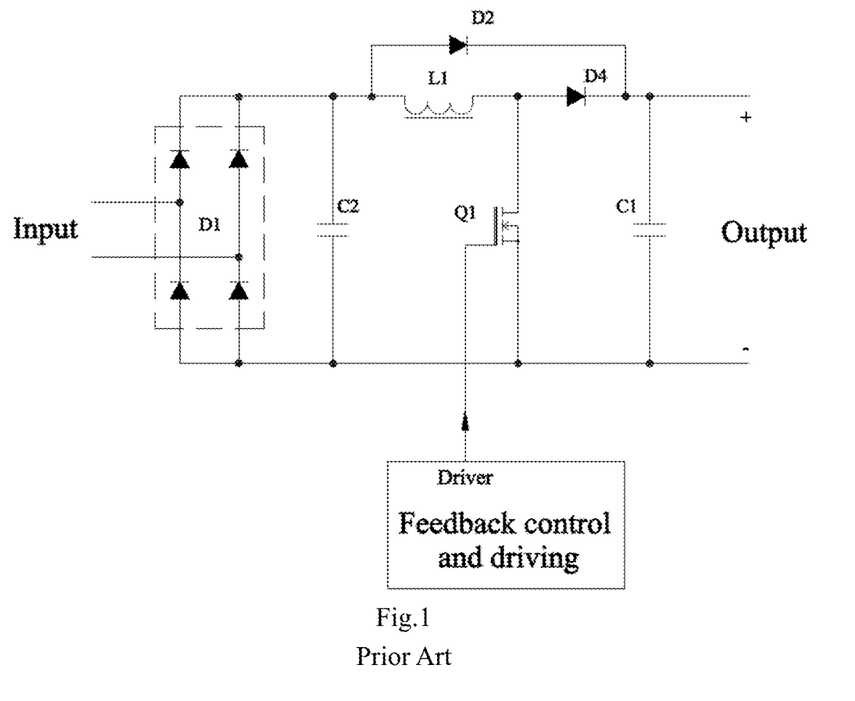
FIG. 1 is a conventional SMPS circuit with a boost PFC circuit.

Current SMPS technology, to realize single phase input power factor correction function, mainly uses boost circuits (FIG. 1). High efficiency, low noise, less stress to components and other factors to improve reliability of the circuit are main objectives for engineers to pursue.

A traditional boost PFC circuit is shown in FIG. 1, wherein a bridge diode D1 rectifies input voltage in full wave mode to charge C2. The boost PFC circuit's operating procedure is as follows: 1) When Q1 turns on, inductor L1 is charged by rectified voltage on C2 and it stores energy. 2) When Q1 turns off, induced voltage on L1 is superimposed onto the rectified voltage on C2 to charge C1. Therefore, voltage on C1 is always higher than input AC instant voltage, making the boost PFC circuit a topology of increasing voltage. Feedback and driving control unit controls Q1's operating duty and frequency to obtain a stable voltage output on C1.

The above traditional boost PFC circuit is able to achieve high power factor to meet IEC6100-3-2 requirement, but it has below demerits:

1. Boost output rectification component D4, which is arranged in the loop of charging capacitor C1, is required to have capability to withstand strong surge at power-on or to satisfy certain EMC surge test. Nowadays, SiC diodes are widely used as boost diodes, but they have weak immunity to surge due to low peak rated current.

2. In the application of conventional boost circuit to inhibit inrush current, an inrush current limiter circuit is inserted into the loop of D2, D4 and C2. Normally, an inrush current limiter is implemented as a thermistor, SCR, FET or relay which could lead to problems of high loss, high cost and turn-on difficulty at low temperature.

3. Switching component Q1 in the boost circuit when working in hard switching mode may result in high loss and low efficiency.

4. In the practice to optimize the design, boost PFC circuit's output voltage is always set to be around peak of a maximum input AC voltage. Therefore, when input voltage is higher than the output voltage, the boost circuit will stop operation and the input voltage will directly charge C1 through D1 and D2. Loss of D2 has to be considered to ensure reliability and efficiency in such a condition.

SUMMARY OF THE INVENTION

The present invention is directed to solve the above disadvantages of the prior art and to provide a boost converter circuit with good immunity to surge, high efficiency and low cost.

The object of the present invention is realized by below technical solution:

A switching mode power supply (SMPS) circuit, comprising: a first input rectification circuit, a first capacitor, a boost feedback control and driving unit, and at least one boost converter circuit, wherein:

the boost converter circuit comprises: a second rectification circuit, a second capacitor and a boost circuit, wherein the boost circuit includes a first inductor, a first switching component and a first output rectification circuit;

the first input rectification circuit rectifies an input voltage and forms, together with the first capacitor, a first loop for charging the first capacitor; the second input rectification circuit rectifies the input voltage and forms, together with the second capacitor, a second loop for charging the second capacitor; one terminal of the first capacitor, one terminal of the second capacitor and an output of the first input rectification circuit are coupled at a same polarity;

when the first switching component is turned on, the first inductor, the second capacitor and the first switching component form a third loop in which an input rectified voltage on the second capacitor charges the first inductor; when the first switching component is turned off, the first inductor, the second capacitor, the first capacitor and the first output rectification circuit form a fourth loop in which an induced voltage on the first inductor is superimposed onto a voltage on the second capacitor to charge the first capacitor through the first output rectification circuit;

the first capacitor supplies energy to a load; and the boost feedback control and driving unit outputs a chopping signal with a predetermined frequency and duty to turn on or turn off the first switching component.

The operating principal of the present invention is described as below:

The first loop of the circuit only operates at the time that the power supply turns on, so as to charge the first capacitor which is a storage capacitor. In an immunity EMC test, the first loop also helps absorb pulse noise or lightning surge energy. After the boost converter circuit starts to work, the voltage on the first capacitor becomes higher than the input AC instant voltage, and the first loop no longer operates.

In the second loop of the circuit, due to the small capacitance value, the voltage on the second capacitor reflects the instant AC input voltage of one respective phase.

Conversion is accomplished by first switching component, second capacitor, first inductor, first capacitor and first rectification circuit. When first switching component turns on, first inductor is charged by rectified instant AC input voltage on second capacitor; when first switching component turns off, induced voltage on first inductor and rectified instant AC input voltage on second capacitor are superimposed to charge first capacitor. Therefore, voltage on first capacitor is always higher than input AC instant voltage, so that boost conversion is accomplished.

Operating duty of each first switching component is driven by the boost feedback control and driving unit to obtain stable output of first capacitor.

The advantage of the present invention lies in:

The SMPS circuit of the present invention provides a boost PFC circuit which has the features of high immunity to surge, high efficiency, low cost, and good EMC performance.

The first output rectification circuit, which is also called a boost diode, does not belong to the first loop that charges the first capacitor, so there will be no power-on inrush current passing through it, and the circuit has strong immunity to input inrush or lightning surge. In addition, as the first inductor does not belong to the first loop either, by-pass diode is not required to prevent first inductor from saturation caused by input inrush current.

When input voltage is higher than output voltage, charging current only passes through D1, so that loss can be reduced and efficiency can be improved at this condition.

DETAILED DESCRIPTION OF EXEMPLARY EMBODIMENTS

The present invention will be further described in the following embodiments in combination with the illustrated figures.

In order to better understand the operation principle of the switching power supply circuit of the present invention, in the following embodiments, components in the circuit are divided into sub-circuits according to their functions. Different sub-circuits may share the same component(s) and shall not cause any misunderstanding.

First Embodiment

Figure 2:
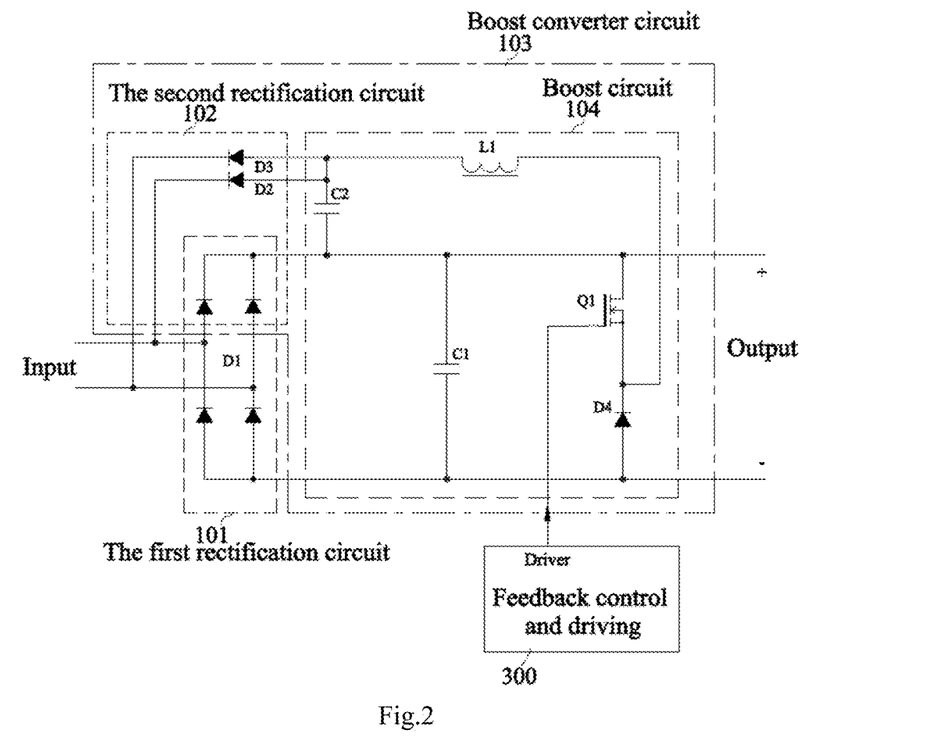
FIG. 2 is a schematic block diagram of the first embodiment.

The first embodiment of three-phase input SMPS as shown in FIG. 2 comprises first rectification circuit 101, first capacitor C1, Boost feedback control and driving unit 300, and at least one Boost converter circuit 103.

First rectification circuit 101 is implemented as a bridge diode D1. Boost converter circuit 103 comprises: second input rectification circuit 102 which is constructed by part of D1, D2 and D3; second capacitor C2 and Boost circuit 104. Wherein Boost circuit 104 includes first inductor L1, first switching component Q1, first output rectification circuit D4, first capacitor C1 and second capacitor C2.

Figure 3A:
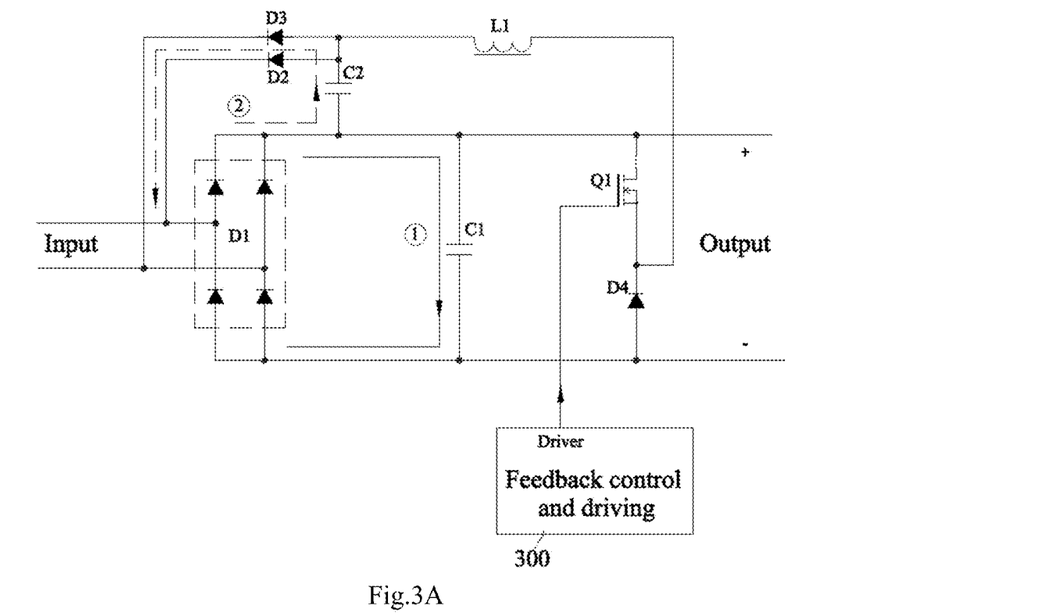
FIG. 3A shows the first loop and second loop in the first embodiment.

First input rectification circuit 101 rectifies input voltage and charges first capacitor C1 by forming a first loop with the first capacitor C1. The second input rectification circuit 102 charges second capacitor C2 by forming a second loop with the second capacitor C2. One terminal of first capacitor C1, one terminal of second capacitor C2 in Boost converter circuit 103, and output of first input rectification circuit 101 are coupled at the same voltage polarity. FIG. 3A is an example showing the coupling at their positive terminals.

In boost circuit 104, when first switching component Q1 turns on, first inductor L1, second capacitor C2 and first switching component Q1 form a third loop in which rectified input voltage on the second capacitor C2 charges first inductor L1. When first switching component Q1 turns off, first inductor L1, second capacitor C2, first capacitor C1 and first output rectification circuit D4 form a fourth loop in which induced voltage on first inductor L1 and voltage on second capacitor C2 superimpose to charge first capacitor C1 through the first output rectification circuit D4.

The first capacitor C1 supplies energy to load.

Boost feedback control and driving unit 300 outputs chopping signal to drive first switching component Q1 with certain frequency and duty which is determined by Boost feedback control and driving unit 300.

As examples and for better comprehension, first input rectification circuit 101, second rectification circuit 102 and first output rectification circuit D4 are shown in the figures as bridge diode or diodes. It can be appreciated that other type of components which are able to perform the same rectification function can also be used.

The SMPS circuit as mentioned above includes two portions:

First portion: two input rectification circuits as shown in FIG. 3A.

Referring to first loop ① shown in FIG. 3A, the first input rectification circuit includes first rectification component D1, which rectifies input voltage in full wave mode, and stores energy in first capacitor C1. When boost circuit operates after power supply's turn-on, boost output voltage on C1 is always higher than instant voltage of AC input, thus AC input no longer charges C1. When boost output power is insufficient to maintain C1's voltage higher than the instant AC voltage, AC input starts to charge C1 again.

Referring to second loop ② shown in FIG. 3A, the second input rectification circuit includes first input rectification component D1 and other input rectification components D2, D3, the second input rectification circuit charges second capacitor C2. Due to relatively small capacitance of C2, voltage on C2 reflects rectified instant voltage waveform of input AC. In active PFC (boost) circuit, C2 serves as a boost capacitor for high frequency noise reduction and improvement of EMI.

Figure 3B:
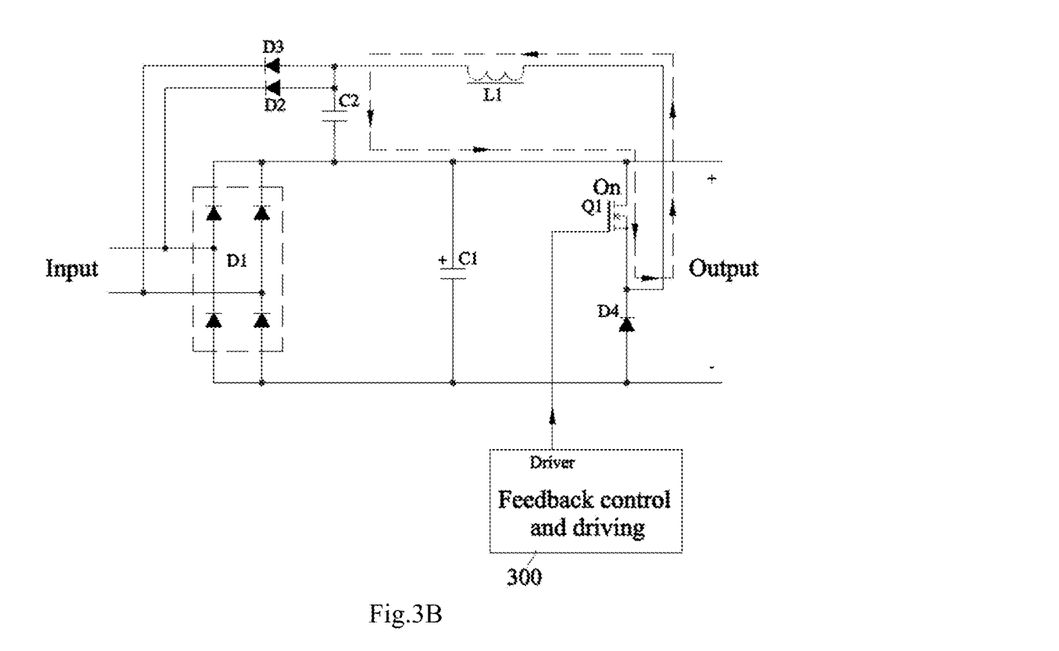
FIG. 3B shows the third loop in the first embodiment.
Figure 3C:
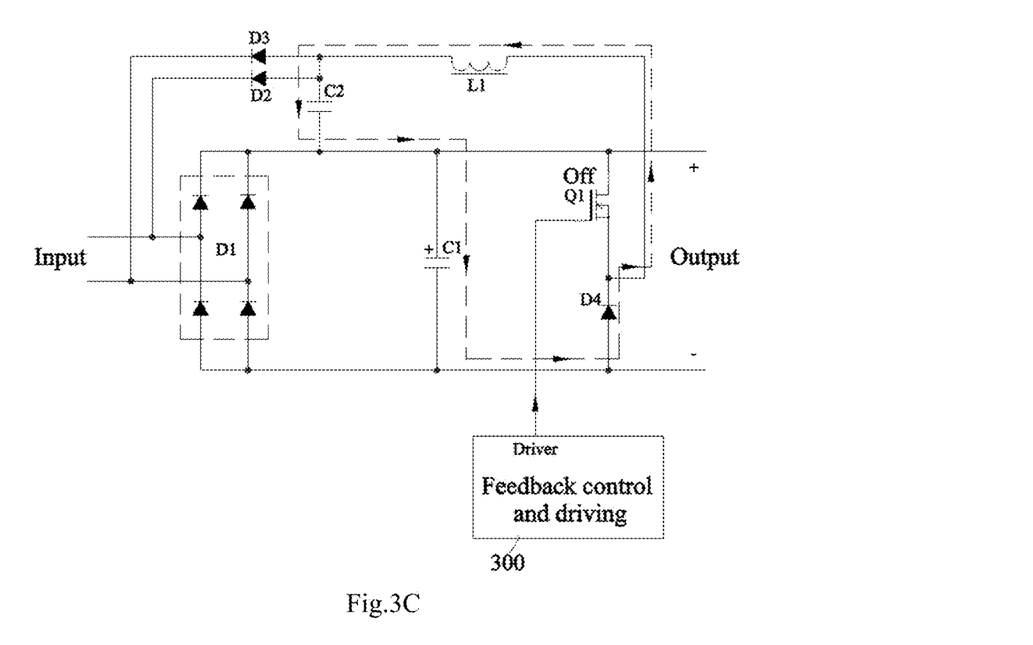
FIG. 3C shows the fourth loop in the first embodiment.

Second portion: boost conversion as shown in FIG. 3B and FIG. 3C.

In the embodiment, first inductor L1 is able to operate in either discontinuous current mode (DCM) or continuous current mode (CCM), and first switching component operates at hard switching mode.

Operation principle:

State 1: First switching component Q1 turns on, as shown in FIG. 3B.

Initial voltage on the first capacitor C1 is rectified input voltage at power supply turn-on, and afterwards the voltage of C1 becomes boost conversion's output voltage which is used to supply energy to load. Voltage on second capacitor C2 reflects the instant AC voltage after rectification.

When voltage on C2 generates a current that flows into first inductor L1 through Q1 as indicated by dotted line in FIG. 3B, boost energy is stored in the L1.

State 2: First switching component Q1 turns off, as shown in FIG. 3C.

When Q1 turns off, the energy stored in L1 induces voltage and accumulates with voltage on C2, to cooperatively charge first capacitor C1 through D4, and thereby boost conversion operates (indicated by dotted line).

In case when L1 enters state 1 of the next cycle, the stored energy in L1 has not been fully released, L1 will operate in a continuous current mode (CCM). In case L1 has fully released the stored energy before the next state 1 starts, its current returns to zero, and then L1 operates in a discontinuous current mode (DCM).

As such, state 1 and state 2 are repeated to realize continuous boost conversion.

In the Boost converter circuit, first inductor L1 and second capacitor C2 absorb energy from AC input by operating according to changes in voltage and phase of AC during switching on and switching off of Q1, to make input AC current synchronous with input AC voltage. As a result, power factor correction function is achieved.

Boost feedback control and driving circuit 300 can be realized by hardware, for example, it may comprise an automatic control circuit consisted of a sensing circuit, a reference circuit and an operational amplifier, and may further comprise a comparator and a triangle waveform generator to output chopping driving signal based on the result of automatic control circuit. Boost feedback control and driving circuit 300 can also be realized by software, for example, software MCU or DSP can be programmed to generate chopping driving signal. Actual applications of feedback control may include constant voltage (CV), constant current (CC) and constant power (CP) control.

Second Embodiment

Figure 4:
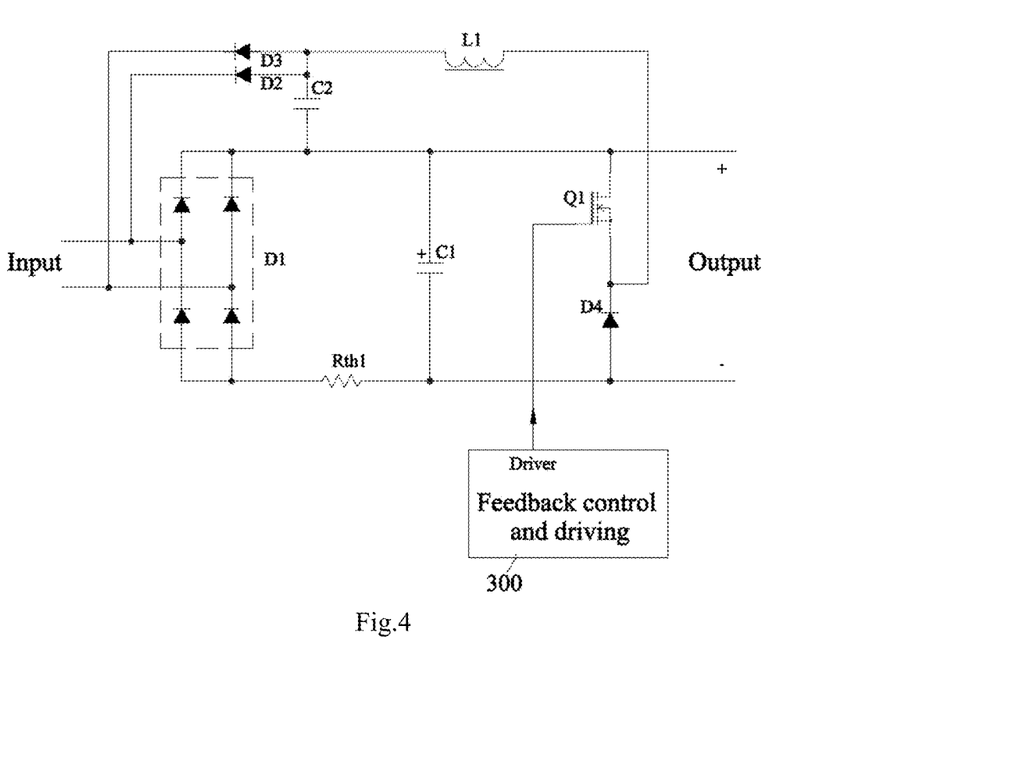
FIG. 4 is a schematic diagram of the second embodiment.

As shown in FIG. 4, the difference of second embodiment compared to the first embodiment lies in: an inrush current limiting circuit Rth1 coupled in series to the first loop. The inrush current limiting circuit Rth1 belongs to the first loop, but does not belong to the second loop, does not belong to the third loop, and does not belong to the fourth loop. Since the first loop only works at power supply's startup, the inrush current limit circuit has no loss during power supply's normal operation. Benefitting from this, Rth1 can be chosen as a normal resistor with high value to be able to withstand and effectively reduce inrush current, without sacrificing the efficiency. Tradeoff between low inrush current and startup capability in traditional design is no longer required. Well-designed inrush current limiting circuit with a combination of resistor, capacitor and inductor could improve EMC surge and noise immunity. By taking advantage of the dual rectification input structure, the inrush current limiting circuit obtains high efficiency and low cost advantages comparing to thermistor or relay circuit used in traditional boost circuits.

Third Embodiment

Figure 5:
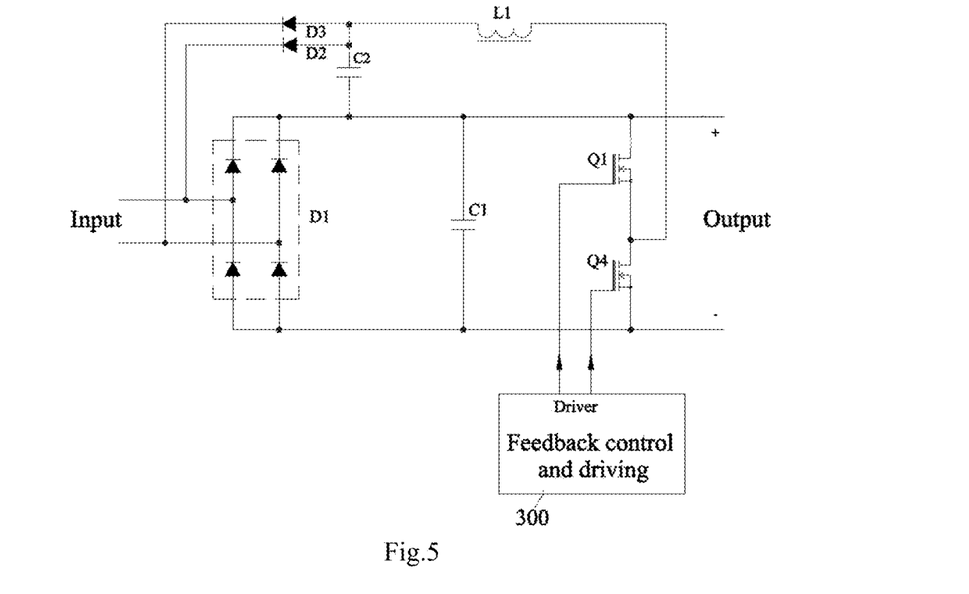
FIG. 5 is a schematic diagram of the third embodiment.

In the third embodiment, the first output rectification circuit in the above first and second embodiments is replaced by a switching component Q4, as shown in FIG. 5. Switching component Q4 acts as a second switching component in the first boost circuit. Switching mode of the two switching components Q1 and Q4 can be controlled by boost feedback control and driving unit 300. In this embodiment, both first switching component Q1 and second switching component Q4 can be designed to operate in soft switching mode, or called zero voltage switching (ZVS) mode.

In this embodiment, if first inductor L1 operates in CCM, then first switching component Q1 operates in hard switching mode whose operating principle is same as first embodiment. Second switching component acts as boost synchronous rectification component.

If first inductor operates in DCM or deliberately designed in DCM, after first inductor's current returns to zero, voltage on C1 charges resonant tank constructed by second capacitor C2 and first inductor L1. By controlling switch-off of second switching component Q4, resonant current is forced to pass through body diode of first switching component Q1, and at the same time discharges its parasitic capacitor, enabling the first switching component Q1 to achieve zero voltage switching at its next switching-on.

Figure 6A:
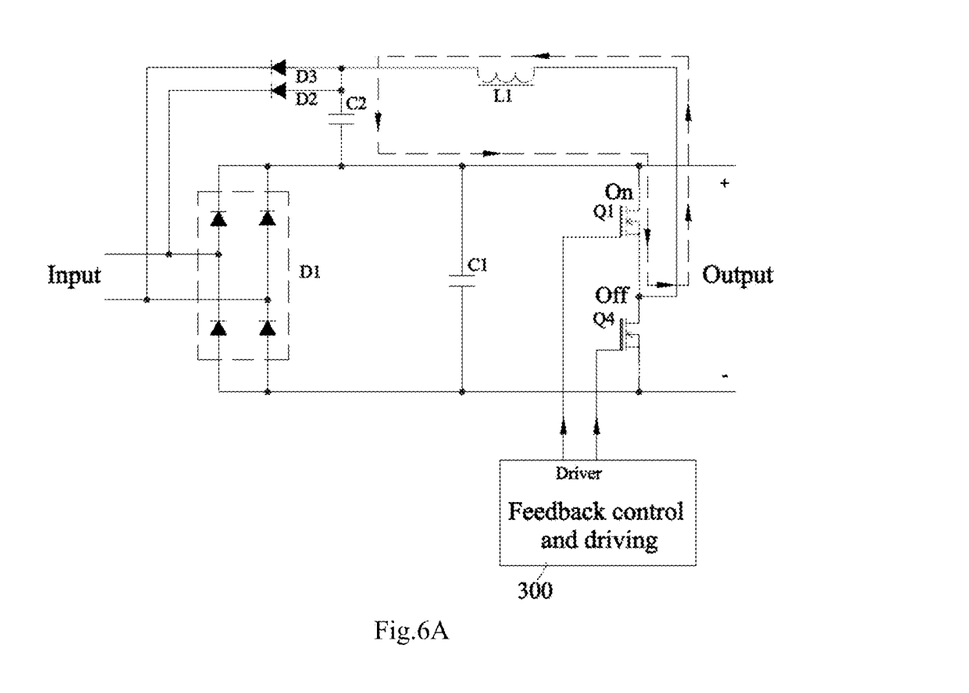
FIG. 6A shows the current loop of operating state 1 in the third embodiment.

Detailed operating principle of soft switching is described as below:

State 1: First switching component Q1 turns on, second switching component Q4 turns off, as shown in FIG. 6A.

Initial voltage on the first capacitor C1 is rectified input voltage at power supply turn-on, and afterwards the voltage on C1 becomes boost conversion's output voltage and provides energy to load. Voltage on second capacitor C2 reflects instant AC voltage after rectification.

When voltage on C2 generates a current that flows into the first inductor L1 through Q1 as indicated in dotted line, boost energy is stored in L1.

Figure 6B:
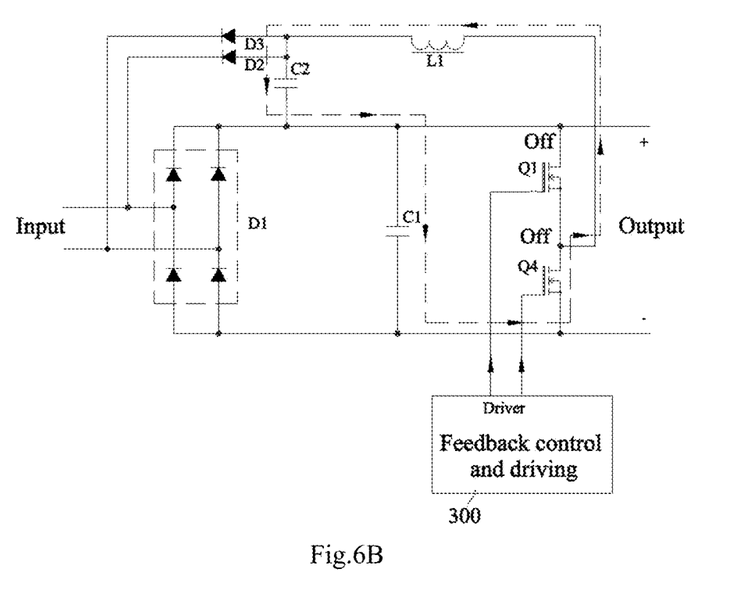
FIG. 6B shows the current loop of operating state 2 in the third embodiment.

State 2: First switching component Q1 turns off, second switching component Q4 remains turned-off, as shown in FIG. 6B.

When Q1 turns off, the energy stored in L1 induces voltage and accumulates with voltage on C2, to cooperatively charge first capacitor C1 through body diode of Q4, and thereby boost conversion operates (indicated by dotted line). The boosted charging current, at the same time, discharges parasitic capacitor of Q4, making it ready for the next zero voltage switching-on.

Figure 6C:
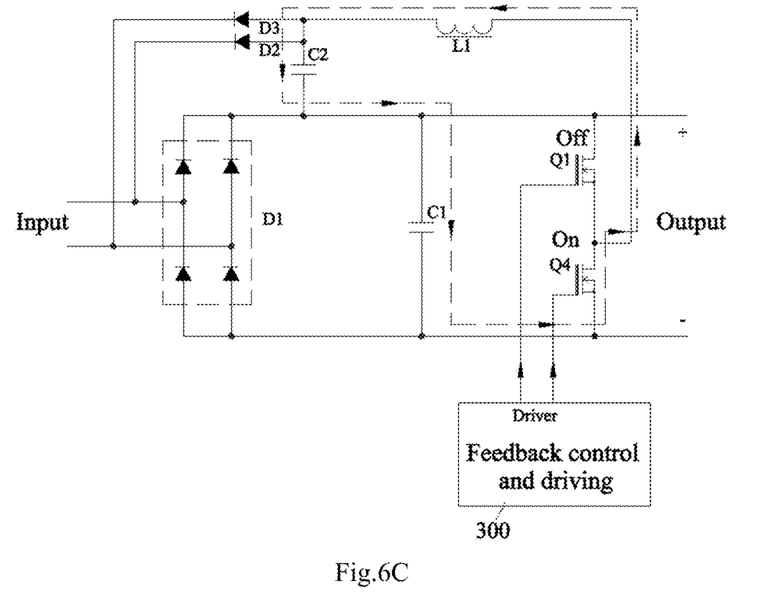
FIG. 6C shows the current loop of operating state 3-1 in the third embodiment.

State 3-1: First switching component Q1 remains off, second switching component Q4 turns on, as shown in FIG. 6C.

First inductor L1 continues releasing energy, and its voltage accumulates with voltage on C2 to continue charging C1 through second switching component Q4 which is now in an on state. Thanks to zero switching and low conducting resistance, this embodiment is able to effectively improve the efficiency compared to first and second embodiments by using switching component instead of rectification component.

Figure 6D:
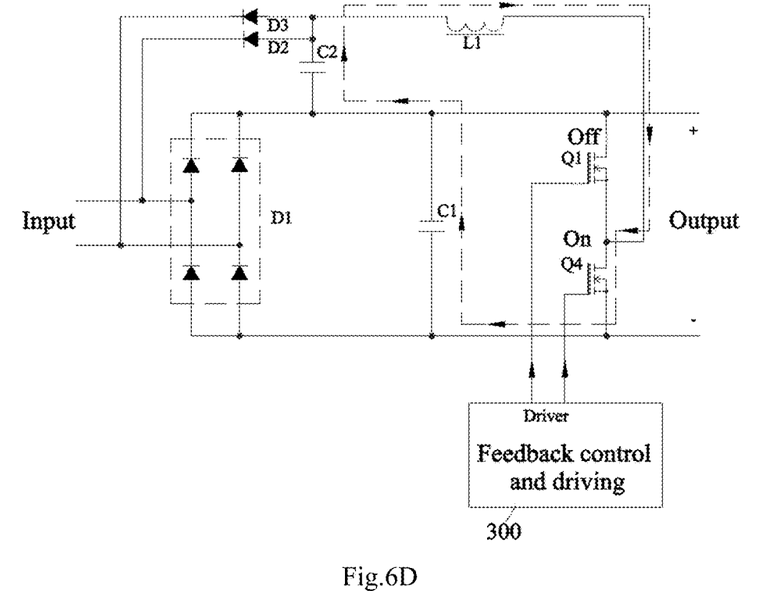
FIG. 6D shows the current loop of operating state 3-2 in the third embodiment.

State 3-2: First switching component Q1 remains off, second switching component Q4 remains on, as shown in FIG. 6D.

After energy in L1 is fully released, Boost converter circuit's current decreases to zero, and then voltage on C1, conducted by Q4, starts to charge resonant tank of L1 and C2.

Figure 6E:
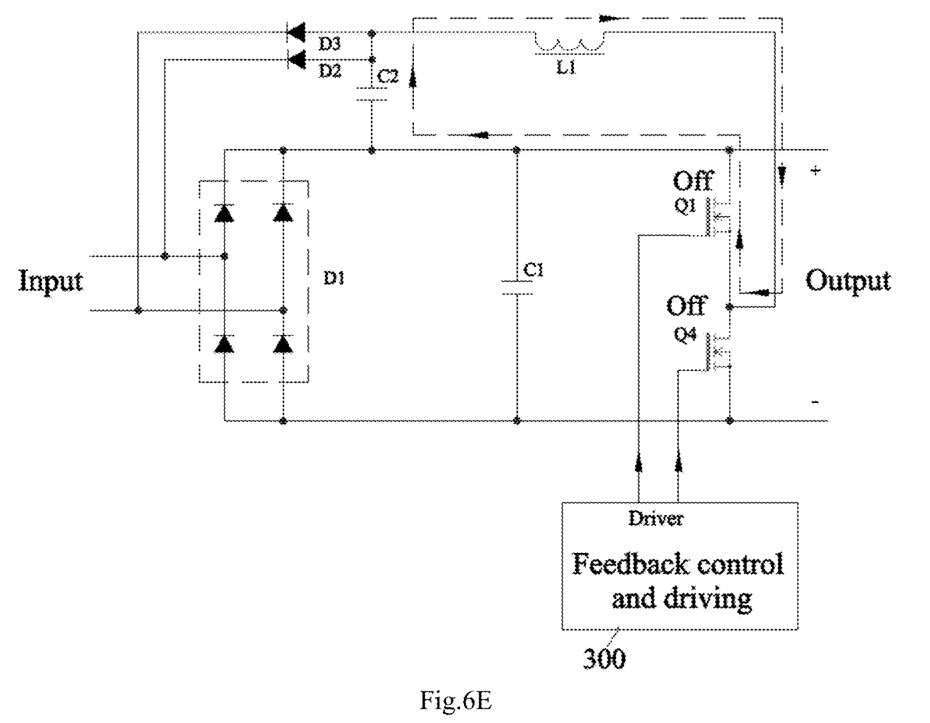
FIG. 6E shows the current loop of operating state 3-2 in the third embodiment.

State 4: First switching component Q1 remains off, second switching component Q4 turns off, as shown in FIG. 6E.

The switching-off of Q4 forces resonant current change direction to go through body diode of Q1, and at the same time discharges parasitic capacitor of Q1, making it ready for the next zero voltage switching-on.

Design the first inductor L1 to operate in DCM, and use boost feedback control and driving circuit 300 to detect zero return of L1's current. Adjust resonant current to discharge parasitic capacitor of Q1 by controlling the time of switching off Q4. As a result, the speed of discharging parasitic capacitor of Q1 can be controlled, allowing Q1's next switch-on to be close to a zero voltage switch-on.

Repeat the process from state 1 to state 4 to accomplish continuous resonant boost conversion.

Figure 7A:
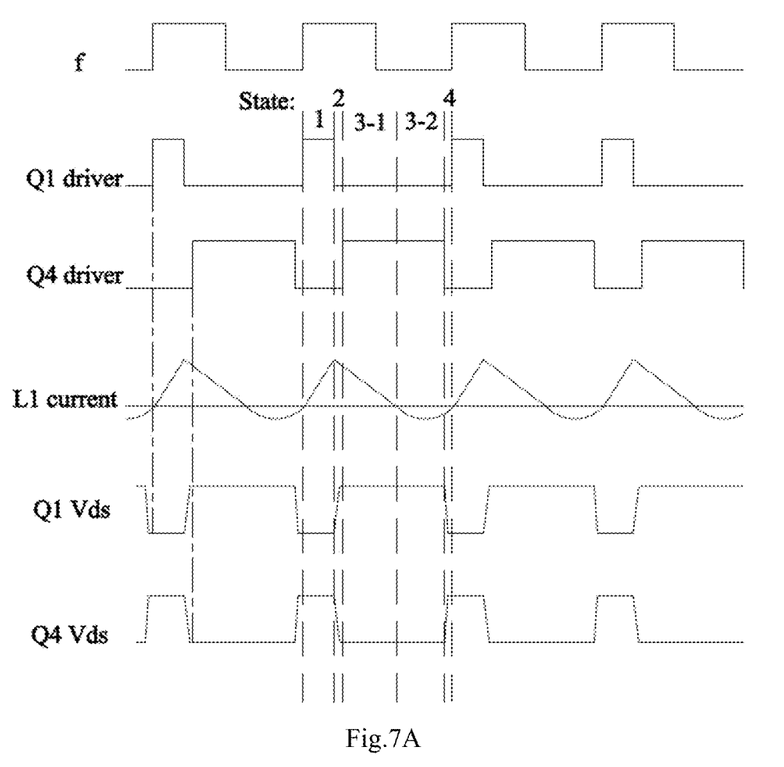
FIG. 7A is the operating waveform of the third embodiment in condition one.

FIG. 7A presents operating waveform of the embodiment. Parasitic capacitors of Q1 and Q4 are discharged by resonant current as described above. Both Q1 and Q4 operate in ZVS mode.

Figure 7B:
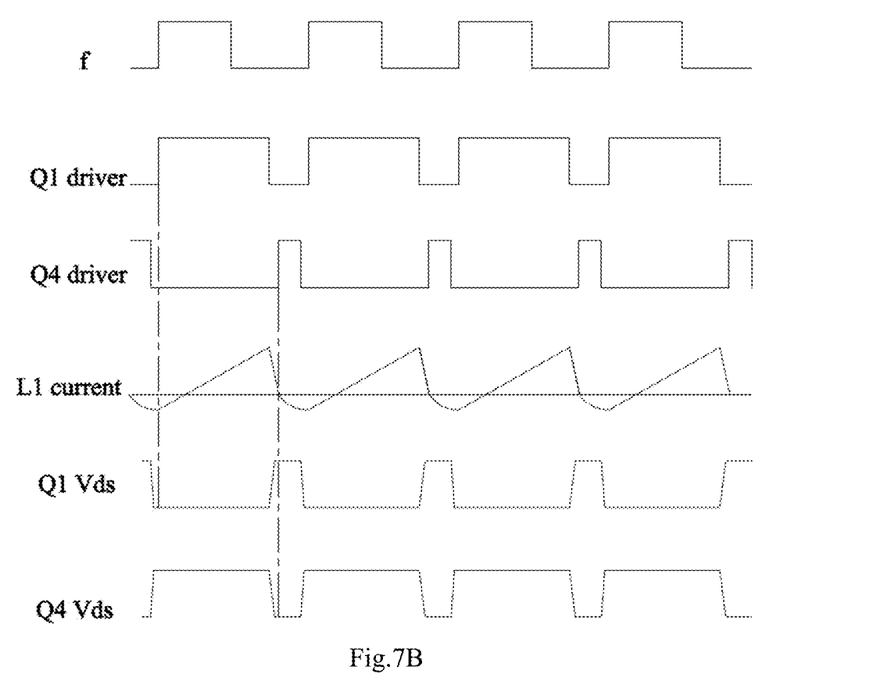
FIG. 7B is the operating waveform of the third embodiment in condition two.

In order to prevent first inductor and second capacitor's resonant current enter capacitive region (reverse), mandatory maximum duty operation is required when AC input is at its low level. FIG. 7B presents the operating waveform in mandatory maximum duty condition. The mandatory maximum duty can be dynamically set according to AC input or load condition.

What is noteworthy is that first inductor L1's magnet reset condition is $Vin \cdot Duty = (Vdc-Vin) \cdot (1-Duty)$. To ensure complete magnetic reset, maximum duty Duty(max) can be derived as below:

$$Duty(max)=(Vdc-Vin)/Vdc$$

where Vin is the instant AC input voltage; Vdc is boost converter circuit's output voltage, namely the voltage on the first capacitor C1.

When Vin is at its sinusoidal peak whose value is very close to Vdc, Duty(max) must be small enough to maintain first inductor's "Voltage·Time" in balance to ensure the magnetic reset. If boost converter circuit's duty is higher than Duty(max), first inductor would saturate, leading to first switching component's damage.

Figure 7C:
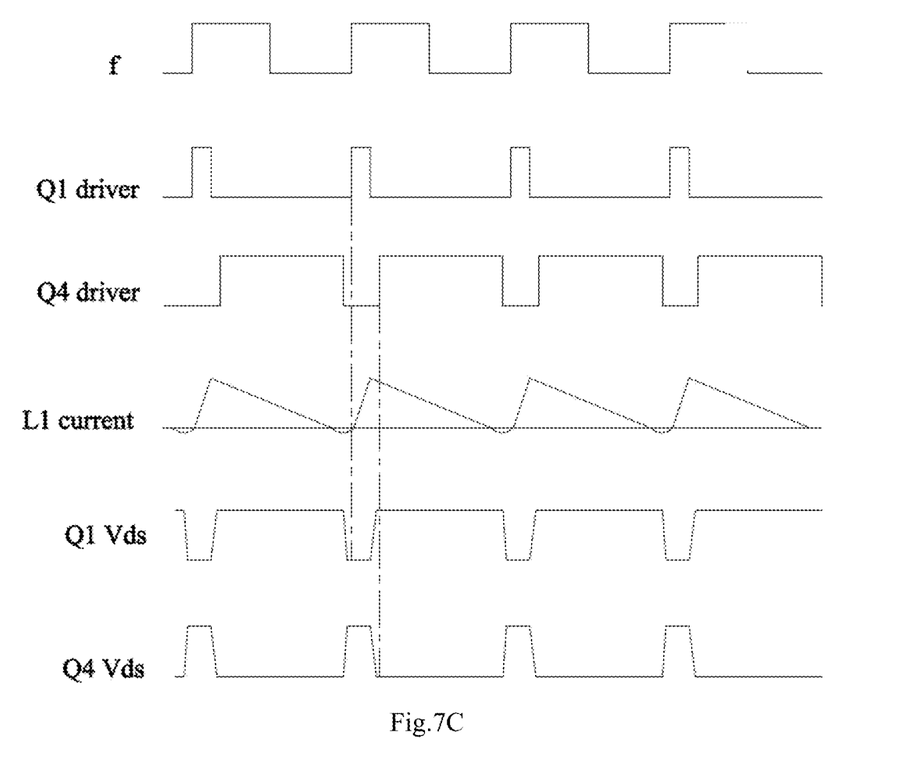
FIG. 7C is the operating waveform of the third embodiment in condition three.

Below method could be used to prevent first inductor from saturation:

Boost feedback control and driving unit 300 monitors both Vin and Vdc to calculate Duty(max) to limit operating duty. Actual operating duty is selected as a minimum of setting duty determined by feedback loop and maximum duty Duty(max).

FIG. 7C presents the operating waveform under limited Duty(max) condition. In this embodiment, by using switching components with low impedance as the first output rectification circuit, it not only reduces conduction loss, but also reduces switching loss by realizing ZVS in DCM, in such a way, resulting in efficiency improvement and noise reduction. Further, in addition to the ZVS operation described above, by using switching components to replace diodes in the input rectification circuit as to be described in the fourth embodiment below, the topology can be even better than bridgeless PFC circuits in terms of efficiency and EMI noise.

Based on the description of first output rectification circuit in first embodiment, any alternative substitutions to the first output rectification circuit shall be considered as under the scope of the present invention.

Fourth Embodiment

Figure 8:
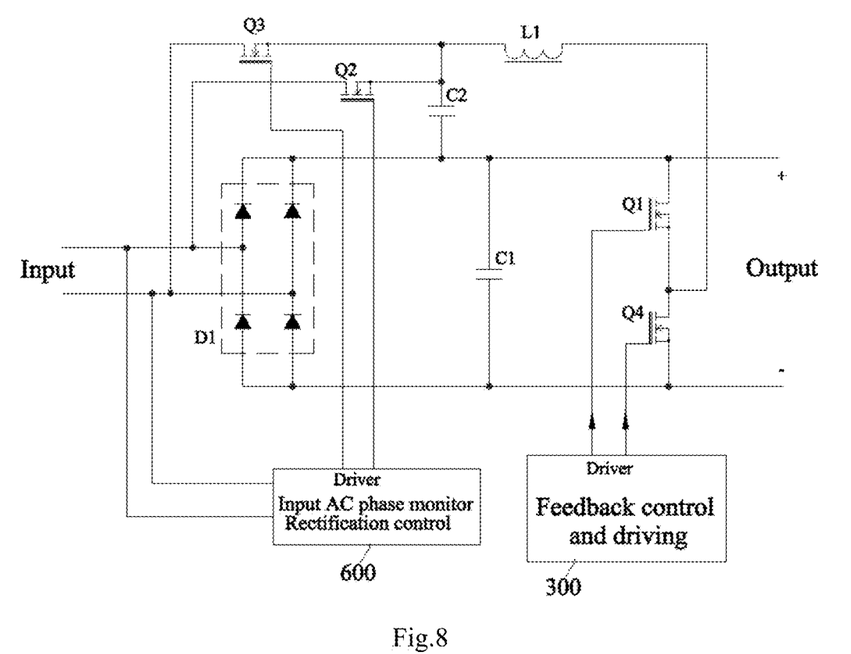
FIG. 8 is a schematic diagram of the fourth embodiment.

The fourth embodiment is constructed by replacing the second input rectification circuit in the above first embodiment, second embodiment and third embodiment with switching components. As shown in FIG. 8, the second input rectification circuit contains second and third switching components Q2, Q3 and bridge diode D1. The second switching component Q2 and third switching component Q3 are implemented as low conducting resistance switching elements like FET, whose on-state loss can be effectively reduced. One terminal of the second switching component Q2 and one terminal of the third switching component Q3 are coupled to the node between the second capacitor C2 and the first inductor L1, the other terminal of the second switching component Q2 and the other terminal of the third switching component Q3 are respectively coupled to two poles of the AC input.

Boost converter circuits' operating principle is same as the first embodiment.

Figure 9:
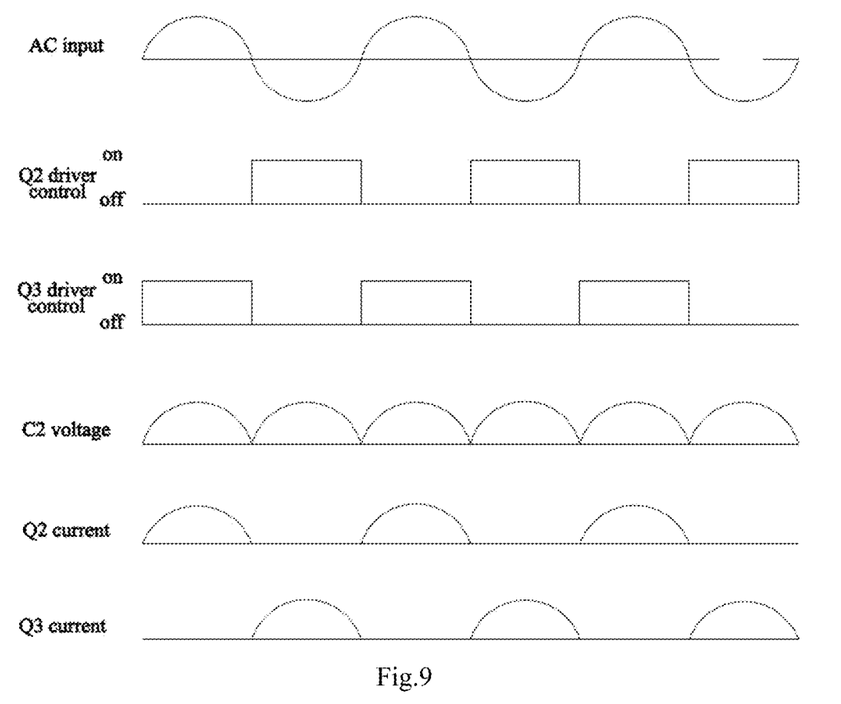
FIG. 9 is the controlling waveform of the fourth embodiment.

The second loop to charge second capacitor is illustrated in FIG. 8 and explained as follows: Input AC phase monitoring and rectification control unit 600 monitors input AC voltage or phase, and controls the synchronous conduction and cut-off of the second and third switching components Q2 and Q3 according to the respective AC input voltage. Due to Q2 and Q3's continuous conducting during AC positive forward interval, no switching loss is consumed comparing to bridgeless PFC circuit, which brings advantage to this embodiment. Control dead time between Q2 and Q3 can improve lightning surge immunity to prevent input short at AC input voltage close to zero. FIG. 9 shows controlling waveform of the fourth embodiment.

Fifth Embodiment

Figure 10:
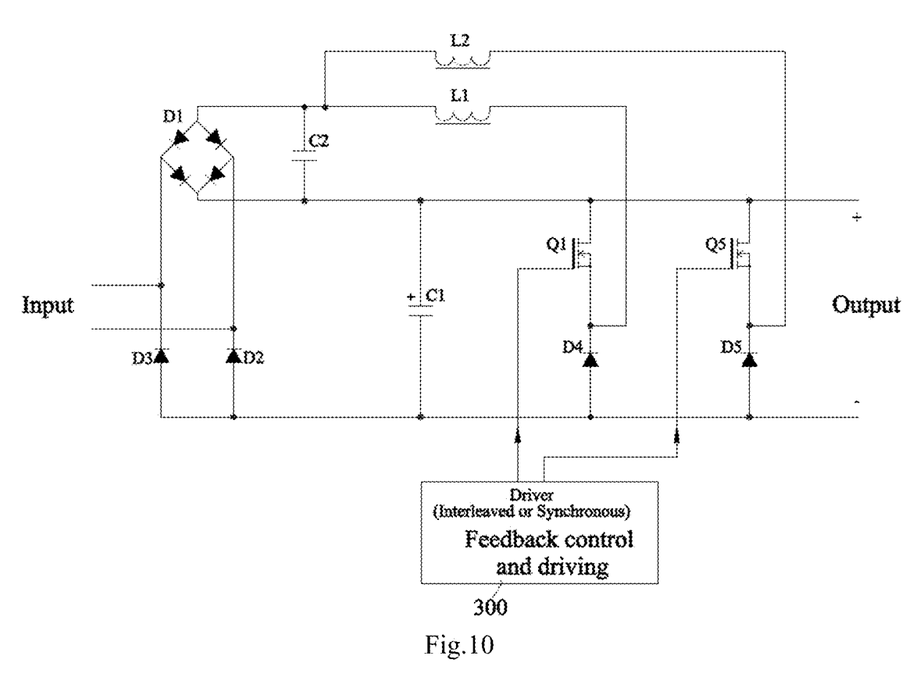
FIG. 10 is a schematic diagram of the fifth embodiment.

The difference of fifth embodiment comparing to the first is:

Two Boost circuits are equipped as shown in FIG. 10:

First switching component Q1, first output rectification circuit D4, second capacitor C2 and first inductor L1 form the first Boost circuit.

Fifth switching component Q5, fifth output rectification circuit D5, second capacitor C2 and first inductor L2 form the second Boost circuit.

These two Boost circuits may operate in synchronous mode or interleaved mode.

Each of the Boost circuits has the third loop and the fourth loop as those described in the first embodiment.

Synchronous mode of Boost circuits can increase output power and balance heat dissipation.

Interleaved or phase-shift mode of Boost circuits can increase output power and reduce switching ripple.

Also differs from first embodiment, in the dual-rectification portion of this embodiment, Bridge diode D1 serves as the second rectification circuit to charge C2, while D3, D4 and D1 form the first rectification circuit to charge C1. As the charging current to C1 only happens at power-on, D3 and D4 can be selected as low current rating diodes to reduce cost.

While the present invention has been shown and described in connection with the embodiments, it will be apparent to those skilled in the art that modifications and variations can be made without departing from the spirit and scopes of the invention as defined by appended claims.

What is claimed is:

1. A switching mode power supply (SMPS) circuit, comprising: a first input rectification circuit, a first capacitor, a boost feedback control and driving unit, and at least one boost converter circuit, wherein:

the boost converter circuit comprises: a second rectification circuit, a second capacitor and a boost circuit, wherein the boost circuit includes a first inductor, a first switching component and a first output rectification circuit;

the first input rectification circuit rectifies an input voltage and forms, together with the first capacitor, a first loop for charging the first capacitor; the second input rectification circuit rectifies the input voltage and forms, together with the second capacitor, a second loop for charging the second capacitor; one terminal of the first capacitor, one terminal of the second capacitor and an output of the first input rectification circuit are coupled at a same polarity;

when the first switching component is turned on, the first inductor, the second capacitor and the first switching component form a third loop in which a rectified input voltage on the second capacitor charges the first inductor; when the first switching component is turned off, the first inductor, the second capacitor, the first capacitor and the first output rectification circuit form a fourth loop in which an induced voltage on the first inductor is superimposed onto a voltage on the second capacitor to charge the first capacitor through the first output rectification circuit;

the first capacitor supplies energy to a load; and the boost feedback control and driving unit outputs a chopping signal with a predetermined frequency and duty to turn on or turn off the first switching component.

2. The SMPS circuit according to claim 1, further comprising an input inrush current limiting circuit which is arranged in the first loop, and does not belong to any one of the second loop, third loop and fourth loop.

3. The SMPS circuit according to claim 2, wherein the input inrush current limiting circuit at least comprises a resistance or any combination of resistance, inductance and capacitance.

4. The SMPS circuit according to claim 1, wherein the second input rectification circuit includes a second switching component, a third switching component and an input AC phase monitoring and rectification control unit; one terminal of the second switching component and one terminal of the third switching component are coupled to a node between the second capacitor and the first inductor, the other terminal of the second switching component and the other terminal of the third switching component are respectively coupled to two poles of an AC input; the input AC phase monitoring and rectification control unit controls a synchronous turn-on or turn-off of the second and third switching components according to a voltage or phase of the input AC.

5. The SMPS circuit according to claim 1, wherein the first output rectification circuit is a fourth switching component; after a current of the fourth loop discharges a parasitic capacitor of the fourth switching component, the fourth switching component is controlled to turn on by the boost feedback control and driving unit in a zero voltage switching mode.

6. The SMPS circuit according to claim 5, wherein the first inductor operates at a discontinuous mode; after a current in the first inductor returns to zero, a resonant current caused by a voltage on the first capacitor charging the second capacitor and first inductor, with the fourth switching component being turned off by the boost feedback control and driving unit, discharges a parasitic capacitor of the first switching component, allowing the first switching component to turn on next time in a zero voltage switching mode.

7. The SMPS circuit according to claim 6, wherein the boost feedback control and driving unit is further configured to monitor a zero-return of the current in the first inductor; when the current in the first inductor is detected to have returned to zero, an instant current to discharge a parasitic capacitor of the first switching component is adjustable by controlling a time of turn-off of the fourth switching component, so as to control a speed and time interval of discharging of the parasitic capacitor of the first switching component, wherein during a dead time when the first and fourth switching components are both turned off, the parasitic capacitor of the first switching component is effectively discharged, allowing the first switching component to turn on next time at a substantial zero voltage state.

8. The SMPS circuit according to claim 5, wherein the boost feedback control and driving unit is further configured to dynamically adjust a dead time of complement driving signal for the first switching component and the fourth switching component.

9. The SMPS circuit according to claim 1, wherein the boost feedback control and driving unit is further configured to monitor both an instant input voltage and an output voltage of each boost converter circuit, and obtain, through logic or mathematic calculation, a maximum duty to ensure a sufficient magnetic reset of the first inductor, so as to limit a conducting time of the first switching component.

10. The SMPS circuit according to claim 1, wherein two or more boost converter circuits are controlled by the boost feedback control and driving unit to operate in a synchronous or interleaved or phase-shift mode.

\* \* \* \* \*